Feb. 11, 1958  C. D. STRICKLER  2,822,612
DENTAL APPLIANCE

Filed Oct. 11, 1956  2 Sheets-Sheet 1

INVENTOR.
Carl D. Strickler,
BY
Loyal J. Miller,
ATTORNEY

Feb. 11, 1958 C. D. STRICKLER 2,822,612
DENTAL APPLIANCE
Filed Oct. 11, 1956 2 Sheets-Sheet 2
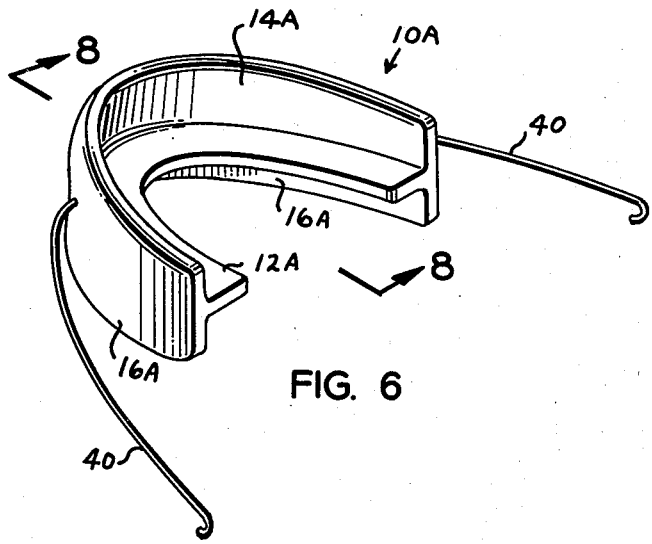
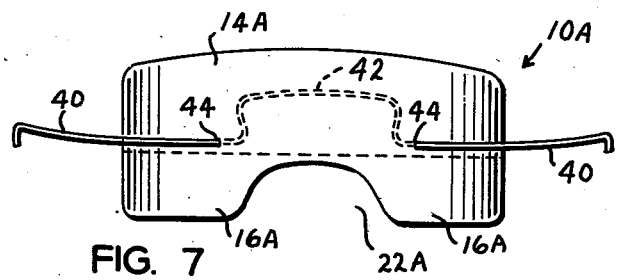
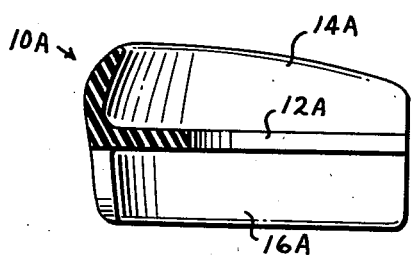
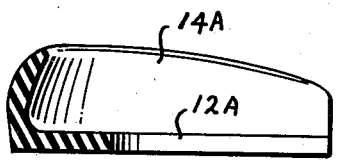
Carl D. Strickler
INVENTOR.
BY Loyal J. Miller
ATTORNEY

United States Patent Office 2,822,612
Patented Feb. 11, 1958

2,822,612

DENTAL APPLIANCE

Carl D. Strickler, Oklahoma City, Okla.

Application October 11, 1956, Serial No. 615,399

2 Claims. (Cl. 32—14)

The present invention relates to dental appliances, and more particularly to a device for use by orthodontists in straightening teeth.

As revealed by the prior art, orthodontic devices in general involve a wide variety of more or less fixed adjustable mechanical interlocks for correcting misalignment of individual teeth, and other conditions of malocclusion.

In some individuals a condition of malocclusion exists by reason of the incisor teeth protruding forwardly of the maxillary arch.

It is therefore the principal object of this invention to provide a dental appliance by which retruding pressure may be applied to forwardly protruding teeth.

Another object is to provide a device of this class which may be worn only at night, or at other selected intervals.

Another important object is to provide a device of this type in which the straightening or corrective pressure placed on the teeth is adjustable by the patient, thus eliminating excessive pressure on a tooth or teeth, as sometimes occurs under periodic adjustment of conventional braces, and the like, by the orthodontist.

A further object is to provide a device of this character which may be formed of soft relatively resilient material, in a series of sizes and a range of corrective angles, so that any individual may be initially and progressively fitted without the loss of valuable chair time.

Still another object is to provide a dental appliance by which protruding teeth may be gradually moved to a desired position without injury to the teeth or the tissues of the dental arch, and with a minimum of discomfort and expense to the patient.

The present invention accomplishes these and other objects by providing a device formed of resilient material, including a web having a curvature substantially conforming to the maxilla dental arch of a normal person and adapted to be received between the teeth and upper lip of the user, with the inward surface of the flange angled rearwardly to contiguously contact the forward surfaces of the incisor teeth. Retruding means carried by the flange medially its ends applies corrective pressure to the teeth.

Other objects will be apparent from the following description when taken in conjunction with the accompanying two sheets of drawings, wherein:

Figure 6 is a perspective view of an alternate embodiment of the device, per se;

Figure 7 is a front elevational view of the alternate embodiment of the device;

Figure 8 is a vertical cross sectional view taken substantially along line 8—8 of Fig. 6; and, Figure 9 is a vertical cross sectional view, similar to Fig. 3, of a modification of the alternate embodiment.

Like characters of reference designate like parts in those figures of the drawings in which they occur.

In the drawings:

Figure 3:
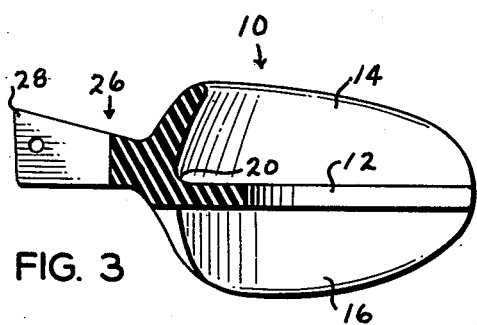
Figure 3 is a vertical cross sectional view taken substantially along line 3—3 of Fig. 1.

The reference numeral 10 indicates, as a whole, the device which may be cast or molded in one piece from any suitable yieldable resilient material. Soft rubber has been found highly satisfactory. The device includes a substantially semi-elliptical band or web 12 having substantially parallel upper and lower surfaces adapted to be horizontally received between the teeth of the maxilla and mandible dental arches of the wearer. The thickness of the web 12 may be varied as desired, but is preferably only of such thickness as may be necessary to enable the device to substantially maintain its desired form or contour. A vertically extendindg flange is integrally connected to the outwardly disposed edge of the web 12 and extends above and below the same, forming an upper flange 14 and a lower flange 16. The flanges 14 and 16 are coextensive with the web 12 and are adapted to lie between the upper and lower lips and the teeth of the wearer. The upper flange 14 is inclined rearwardly from its juncture with the web at the forward or portion which contacts the incisor teeth, thus forming an angle with relation to the plane of the web 12 (Fig. 3). The remainder of the flange 14 is substantially perpendicular with relation to the web 12. The angle formed by the juncture of the flange 14 with the web 12 will be fixed for each of the devices, but it is to be understood that, for treating any one individual, a series of these devices will be used beginning first with the device having the more acuate angle, which conforms or fits the particular angle of tooth protrusion, and later changing to those devices having a greater angle as the teeth are progressively straightened. A relatively small inside radius 20 is formed at the juncture of the flange 14 with the upper surface of the web 12 in the forward portion of the device which contacts the incisor teeth. The purpose of the radius 20 is to prevent a wedging action of the incisor teeth which would tend to force the teeth upwardly into the gums in contradistinction to urging the lower ends of the teeth rearwardly.

Figure 5:
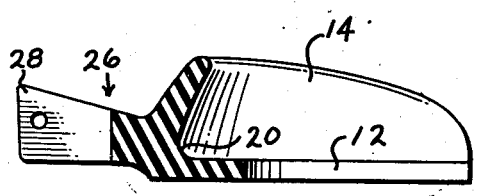
Figure 5 is a vertical cross sectional view of a modification of the device, as seen in Fig. 3.
Figure 4:
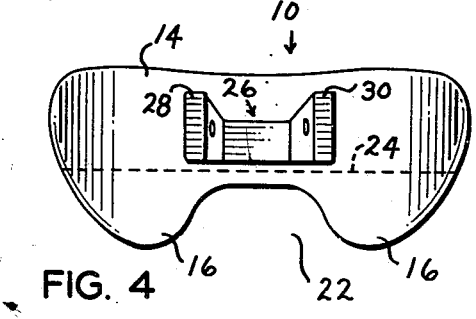
Figure 4 is a front elevational view of the device.

The central forward portion of the depending flange 16 is preferably provided with an arcuate recess or opening 22 for permitting mouth breathing by the wearer (Fig. 4). In some instances it may be desirable to form the device without the lower flange 16 and, in this instance, the lower portion of the device would terminate along the dotted line 24 of Fig. 4. Fig. 5 clearly illustrates such a modification in cross section. As shown in Fig. 3, the flanges 14 and 16 each taper or converge toward their respective upper and lower free edges for preventing undue discomfort to the lips or gums of the wearer.

As shown by Figs. 1 to 5, inclusive, the device further includes a substantially U-shaped element 26 integrally connected substantially horizontal to the central forward outer surface of the flange 14. The legs of the U-shape terminate in diverging relation forwardly of the flange 14 in spaced-apart relation and are angled slightly upwardly with relation to the plane of the web 12, thus forming a pair of prongs 28 and 30. The purpose of the element 26 is to provide a connection for retruding means, as will presently be apparent. The element 26 projects forwardly between and beyond the lips of the wearer. At its juncture with the flange 14, the element 26 is substantially of rectangular configuration and has a vertical thickness which is preferably approximately twice the thickness of the web 12. The lower surface of the element 26 at its juncture with the flange 14 lies substantially parallel with the plane of the upper surface of the web 12. Transversely, the width of the element 26 is such that it may be comfortably worn between the lips and yet having a sufficient width to space the prongs 28 and 30 so that retruding means connected thereto will tend to provide a lateral and rearward pull on the forward portion and each respective side of the device.

Figure 1:
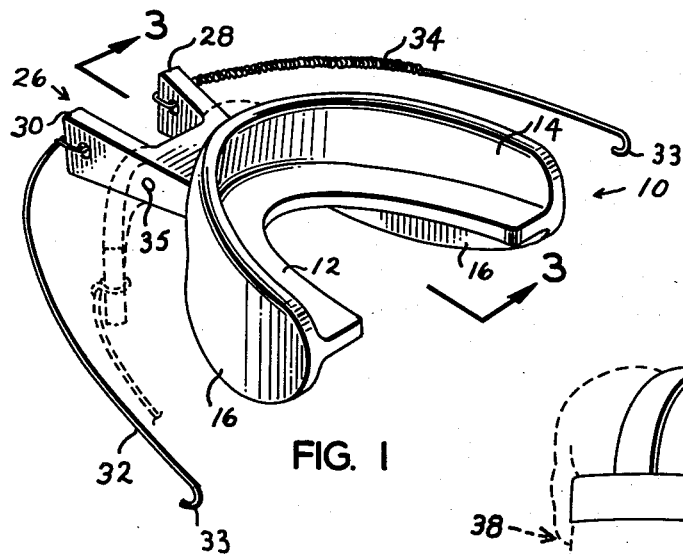
Figure 1 is a perspective view of one embodiment of the device, per se, and showing, in dotted lines, the selective position of parts of the device when under tension.
Figure 2:
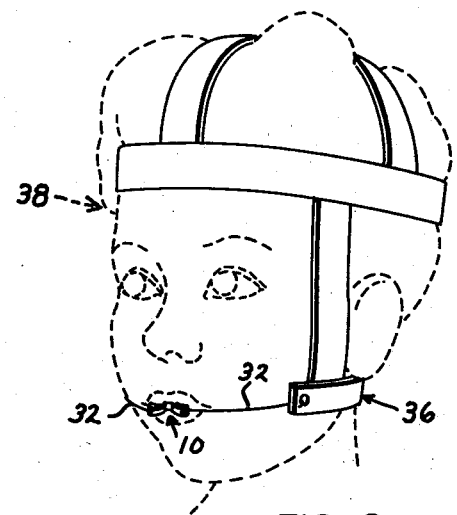
Figure 2 is a perspective view of the device shown in Fig. 1, in operative position on a patient, the patient's head being shown in dotted lines.

Retruding means in the form of a wire member 32 is connected at one end to the forwardly projecting end portion of each respective prong 28 and 30 through a suitable perforation therein. If preferred, the retruding means may comprise a spring such as is shown at 34 (Fig. 1).

Operation

In operation the device 10 is installed within the wearer's mouth as described hereinabove. The retruding wires 32 are bowed outwardly in spaced relation with respect to the wearer's cheeks and extend rearwardly a selected distance. The rearward end of each of the wires 32 are curved arcuately downwardly, as at 33, and are connected in a conventional manner to a conventional head gear 36 carried by the head 38 of the wearer. The wires 32, or head gear 36, are adjusted to the desired tension for exerting a pull on the respective prongs 28 and 30. As shown by dotted lines in Fig. 1 and in solid lines in Fig. 2, the prongs 28 and 30 when under tension will flex rearwardly, thus causing a pressure to be directed against forwardly protruding teeth. A particular advantage of this type of appliance lies in the fact that the wearer, after being fitted by the dentist or orthodontist, may remove or install the device at will, thus permitting the wearing of the device at moments of leisure or while sleeping. The resilient flexibility of the prongs 28 and 30 provide a continual pull on the protruding teeth, with the amount of pull or pressure being determined by the adjustment of the wires 32 relative to the head gear 36.

Obviously other types of conventional head gear may be used other than the particular one illustrated, for example, a neck band may be used. Similarly, tape may be attached to the prongs 28 and 30 and appropriately connected or fastened around the neck of the user for providing a tension or pull.

If desired, the element 26 may be transversely perforated at any point intermediate its ends, as at 35, and a single length or section of retruding wire inserted therethrough and connected at each of its ends in a conventional manner to the desired head gear.

Referring now more particularly to Figs. 6 to 9, inclusive, an alternate embodiment of the device 10A is illustrated. The alternate device 10A is similarly formed with relation to the preferred embodiment having a web 12A, upper and lower flanges 14A and 16A, respectively, with the lower flange being provided with a breathing space 22A. Similarly, the embodiment 10A may be formed without the lower flange 16A, if desired, as shown in cross section in Fig. 9.

Retruding means in the form of a single wire 40 is connected to the central forward portion of the flange 14A by imbedding the medial portion of the wire within the flange when the device is molded. As shown by dotted lines (Fig. 7), the wire 40 is arcuately formed to describe an inverted U-shape 42 within the flange 14A. The wire enters the flange 14A in laterally spaced-apart relation, as at 44, substantially parallel with the plane of the upper surface of the web 12A, thus disposing the upper portion of the inverted U-shape 42 across the central or upper portion of the incisor teeth when the device is in wearing position. This permits the wire 40 to protrude rearwardly from each side of the wearer's mouth between the lips without discomfort, and yet applies pressure to the teeth above the lower ends thereof.

The operation of the device 10A is otherwise identical with relation to the preferred embodiment 10 in that the rearward end of the retruding wire 40 is similarly conventionally connected to the head gear 36.

Obviously the invention is susceptible to some change or alteration without defeating its practicability, and I therefore do not wish to be confined to the preferred embodiment shown in the drawings and described herein further than I am limited by the scope of the appended claims.

I claim:

1. A dental appliance of resilient material for exerting a corrective influence against malocclusion, including: a substantially semi-elliptical horizontally disposed web having substantially parallel upper and lower surfaces adapted to be received between the maxilla and mandible dental arches of the wearer, the outer edge of said web having a curvature substantially conforming to the maxilla dental arch of a normal human being; a flange integrally carried by the outer edge of said web and projecting upwardly therefrom and adapted to lie between the teeth and upper lip of the wearer, the inner surface of said flange inclined rearwardly and upwardly from the forward medial portion of said web and adapted to contiguously contact the anterior surfaces of the incisor teeth of the wearer, said flange forming an inside radius at its juncture with the forward portion of said web; a pair of laterally spaced-apart prongs of resilient material integrally carried by the medial forward portion of said flange, said prongs adapted to project forwardly between and beyond the lips of the wearer; and a pair or retruding members each connected at one end to the respective free ends of said prongs.

2. Structure as specified in claim 1, and a depending flange of resilient material integrally carried by the outer edge of said web and adapted to lie between the teeth and the lip of the wearer.

References Cited in the file of this patent

UNITED STATES PATENTS

| | | |
|---|---|---|
| 523,192 | Angle | July 17, 1894 |
| 2,775,036 | Kesling | Dec. 25, 1956 |